Sept. 7, 1965   R. HOCHSTEIN   3,205,507
MOTION PICTURE CAMERA WITH FILM CONTROLLED SIGNAL
Filed Sept. 20, 1962
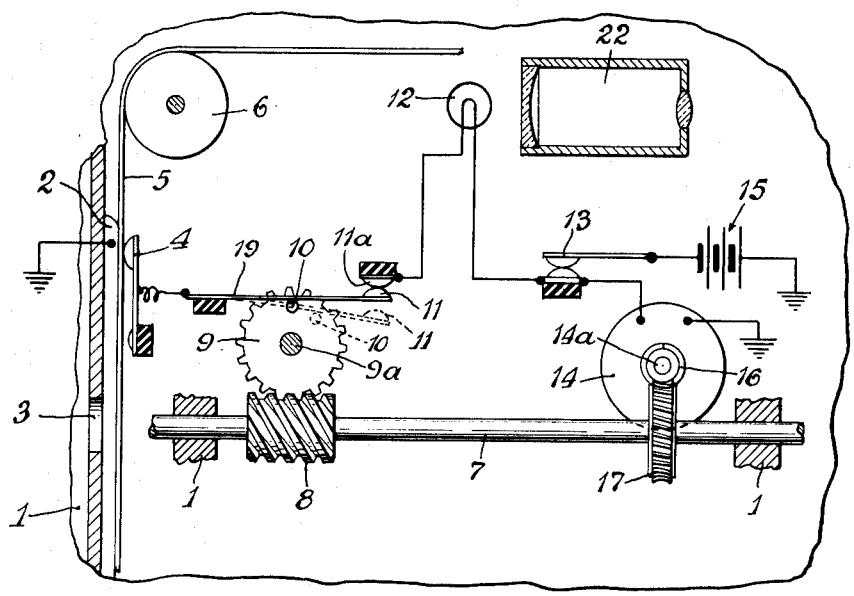

United States Patent Office 3,205,507
Patented Sept. 7, 1965

3,205,507
MOTION PICTURE CAMERA WITH FILM
CONTROLLED SIGNAL
Roland Hochstein, Kiel-Wik, Germany, assignor to Zeiss
Ikon Aktiengesellschaft, Stuttgart, Germany
Filed Sept. 20, 1962, Ser. No. 225,076
Claims priority, application Germany, Sept. 21, 1961,
Z 8,978
4 Claims. (Cl. 352—171)

The invention relates to a motion picture camera and particularly to a small film motion picture camera which is provided with a film controlled warning device for indicating a break in the film or the end of the film supply.

It is an object of the invention to provide a motion picture camera, particularly a small film camera, with a film controlled warning device in which the circuit of a visible electric signal is provided with two contact portions which are arranged with respect to each other in such a manner that the motion picture film which is moved in the camera serves as an insulator between the same so that the circuit is open and the signal is inoperative. When the film breaks or has completely run off the supply spool, the two contact portions engage one another and close the circuit of the warning device, such as a lamp, which is then visible in the viewfinder of the camera.

The drawing illustrates diagrammatically a small film motion picture camera provided with an electric warning device which is controlled by the film moving in the camera.

The camera casing 1 is provided with a guide 2 for the film which comes from a not illustrated supply spool and moves over a guide roller 6 and past a picture window 3. Above the picture window 3 a spring supported contact member 4 is arranged in such a manner that the contact 4 will engage the guide 2 when no film is moved along this guide 2. When the film 5 has been inserted in the camera and moves past the picture window 3 along the guide 2, the contact 4 will engage the film and therefore will not touch the film guide 2 which, as shown, is grounded.

Within the camera casing 1 is mounted a rotatably supported shutter shaft 7 which carries between its ends a worm 8 which in turn is in meshing engagement with gear teeth provided on the circumference of a circular disc 9 rotatably mounted about an axis 9a extending transversely to the axis of the shaft 7. The circular disc 9 carries an eccentric pin 10 which is adapted to engage the yieldable portion 19 of a flicker contact 11 when the eccentric pin 10 reaches its highest point during the rotation of the disc 9. This flicker contact 11 is arranged in the same circuit with the warning contact 4 and is adapted to engage a contact 11a. The contact 11a is connected with a flicker lamp 12 which, when lit, is visible in the viewfinder 22 of the camera. The shutter shaft 7 carries also a worm gear 17 which is driven by the worm 16 arranged on the armature shaft 14a of an electric motor 14 mounted in the camera casing 1. This electric motor 14 is arranged in the already mentioned circuit which is energized by a battery 15, one terminal of which is grounded as is one terminal of the electric motor. In addition, there is arranged in the motor circuit a switch 13 for controlling the operation of the motor 14.

The operation of the device of the invention is as follows:

The camera is set into operation by closing the motor switch 13 by any suitable means accessible to the camera user. The motor 14 drives the worm 16 and therewith the worm wheel 17 arranged on the shutter shaft 7. The result is that also the circular disc 9 is rotated by the worm 8. In the position shown in the drawing the eccentric pin 10 is in its highest position and has moved the flicker contact 11 into engagement with the contact 11a.

The only opening in the heretofore described electric circuit is formed by the contact 4 which engages the insulating material of the film 5. Accordingly, the flicker lamp 12 is not energized but the electric motor 14 is operating. If, however, the film 5 should break for any reason or if the film supply has been exhausted and the end of the film has moved past the contact 4, then the later engages the grounded film guide 2 and the result is a closure of that portion of the electric circuit which contains the lamp 12. When the contacts 11 and 11a and the motor switch 13 are in the illustrated position, the flicker lamp 12 will be energized and this will be noticed in the viewfinder. The flicker lamp 12 will remain energized as long as the warning contact 4 is grounded and the contacts 11 and 11a engage one another. In order to make this warning signal clearly distinguishable in the viewfinder, the lamp 12 is caused to flicker, for which purpose is provided the worm 8, the circular disc 9 with the eccentric pin 10 and the flicker contact 11.

In the operative position of the camera, namely when the motor 14 is operating, the flicker contact 11 is periodically moved into engagement with the contact 11a by the eccentric pin 10 on the rotating disc 9.

In order to prevent a continuous excitation of the flicker lamp 12 when the warning circuit is closed and when the camera is not in operation, the electric circuit is provided with the mentioned motor switch 13. When the motor switch 13 is open for the purpose of discontinuing the drive of the motor 14, the warning circuit is also opened even when accidentally the eccentric pin 10 should remain in a position in which the contacts 11 and 11a are in engagement with one another.

What I claim is:

1. In a motion picture camera, an electrically operated warning device means controlled by the film in said camera for controlling the operation of said warning device, said means including an electric circuit, two contact portions arranged in said electric circuit opposite to one another and separated from one another by a portion of the film inserted in said camera, a pair of normally separated contacts in said circuit, drive means for moving said film in said camera, and means operated by said film moving means for periodically closing said pair of contacts, whereby the circuit of said warning device is intermittently closed when said two contact portions are no longer separated from one another by said film said means for moving said film in said camera including an electric motor, a source of current, a switch for controlling the operation of said electric motor and means connecting said electric circuit containing said warning device with said switch in such a manner that said electric circuit is adapted to be energized by said source of current only when said switch is closed and said motor operates.

2. In a motion picture camera provided with a viewfinder and means controlled by the film in said camera for controlling the operation of a warning device which is arranged to become visible in said viewfinder, said means including an electric circuit, two contact portions arranged in said electric circuit opposite to one another and separated from one another by a portion of the film inserted in said camera, a pair of normally separated contacts in said circuit, drive means for moving said film in said camera, and means operated by said film moving means for periodically closing said pair of contacts, whereby the circuit of said warning device is intermittently closed when said two contact portions are no longer separated from one another by said film said means for moving said film in said camera including an electric motor, a source of current, a switch for controlling the operation of said electric motor and means connecting said electric circuit containing said warning device with said switch in such a manner that said electric circuit is adapted to be energized by said source of current only when said switch is closed and said motor operates.

3. In a motion picture camera, an electrically operated warning device means controlled by the film in said camera for controlling the operation of said warning device, said means including an electric circuit, two contact portions arranged in said electric circuit opposite to one another and separated from one another by a portion of the film inserted in said camera, a pair of normally separated contacts in said circuit, drive means for moving said film in said camera, and means operated by said film moving means for periodically closing said pair of contacts, whereby the circuit of said warning device is intermittently closed when said two contact portions are no longer separated from one another by said film, one of said two contact portions being formed by a film guide which guides the film past the picture window of the camera, while the other contact portion is formed by a yieldably mounted electrical contact member engaging said film which is moved through said film guide said means for moving said film in said camera including an electric motor, a source of current, a switch for controlling the operation of said electric motor and means connecting said electric circuit containing said warning device with said switch in such a manner that said electric circuit is adapted to be energized by said source of current only when said switch is closed and said motor operates.

4. In a motion picture camera, an electrically operated warning device means controlled by the film in said camera for controlling the operation of said warning device, said means including an electric circuit, two contact portions arranged in said electric circuit opposite to one another and separated from one another by a portion of the film inserted in said camera, a pair of normally separated contacts in said circuit, drive means for moving said film in said camera, and means operated by said film moving means for periodically closing said pair of contacts, whereby the circuit of said warning device is intermittently closed when said two contact portions are no longer separated from one another by said film, said means for moving said film including a shaft mounted in the camera, an eccentric pin driven by said shaft and adapted to periodically close said pair of normally separated contacts, an electric motor for driving said shaft, a source of current, and a switch for controlling the operation of said electric motor, said switch having two contacts of which one is connected with said electric circuit to energize the same by said source of curent when said switch is closed and rendering said electric circuit inoperative when said switch is opened.

References Cited by the Examiner

UNITED STATES PATENTS

| | | | |
|---|---|---|---|
| 2,441,185 | 5/48 | Brown et al. | 352—173 |
| 3,004,250 | 10/61 | Rendsburg | 352—170 X |
| 3,006,239 | 10/61 | Smolar | 352—180 |

FOREIGN PATENTS 743,603   1/33   France.

NORTON ANSHER, *Primary Examiner.*

WILLIAM MISIEK, *Examiner.*